United States Patent [19]

Orlov et al.

[11] 3,869,303

[45] Mar. 4, 1975

[54] METHOD OF SURFACE MODIFICATION OF POLYMER MATERIALS

[76] Inventors: Vladimir Alexandrovich Orlov, Smolenskaya ulitsa, 10, kv. 101; Vera Dmitrievna Zaitseva, Novo-Gireevskaya, 4, kv. 109; Viktor Alexeevich Sinitsyn, ulitsa Festivalnaya, 24, kv. 100; Ekaterina Efimovna Rostovtseva, Mosfilmovskaya ulitsa, 18, kv. 18, all of Moscow, U.S.S.R.

[22] Filed: Sept. 22, 1972

[21] Appl. No.: 291,344

Related U.S. Application Data

[63] Continuation of Ser. No. 55,289, July 15, 1970, abandoned.

[52] U.S. Cl. ............. 117/47 A, 117/47 R, 117/118, 117/138.8 UA, 117/139
[51] Int. Cl. ............................................. B44d 1/092
[58] Field of Search ........ 117/47 A, 118, 138.8 UA, 117/139, 47 R; 260/94.7 R

[56] References Cited
UNITED STATES PATENTS
3,471,313   10/1969   Saubestre et al.................. 117/47 R
3,616,294   10/1971   Khelghatian...................... 117/47 A

*Primary Examiner*—William D. Martin
*Assistant Examiner*—Janyce A. Bell
*Attorney, Agent, or Firm*—Holman & Stern

[57] ABSTRACT

A method of surface modification of polymer materials, according to which said materials are treated with an aqueous solution comprising a mineral acid, a mineral oxidant, and a salt of hydrochloric, hydrobromic, or hydroiodic acid. Water, said mineral acid, mineral oxidant and salt are taken in a weight ratio of 50–1000:0.3–7:0.1–7:1–15 respectively. By carrying out modification of polymer materials in accordance with the present method, the initial strength of the treated materials remains unaffected. Moreover, in the process of treating the materials, the latter acquire desired adhesion properties, whereby strength of cementing of polymer materials with each other, with metals, wood, glass-reinforced plastics and glass is ensured.

4 Claims, No Drawings

METHOD OF SURFACE MODIFICATION OF POLYMER MATERIALS

The present invention relates to methods of surface modification of polymer materials.

The surface modification is effected prior to cementing polymer materials to each other, or prior to cementing polymer materials to metals, wood, glass-reinforced plastics, or glass. A high strength of adhesion is of importance in this case, which is achieved by carrying out said surface modification.

A method of surface modification of polymer materials by treating them with an aqueous solution comprising a mineral acid and a mineral oxidant, or with a mixture of sulphuric and chromic acid with a mineral oxidant in water is known in the art (cf. U.S. Pat. No. 3,317,330; D.A. Kardashov, "Sinteticheskie Klei" /Synthetic Adhesives/, Moscow, "Khimiya" Publishers, 1968, p.387).

The known method, however, is disadvantageous in that it requires the use of aqueous solutions with a high concentration of mineral acids (up to 98%). This circumstance results in a sharp deterioration of the strength of materials being treated. Difficulties encountered in washing out the acids from the surface of polymer materials brings about a deterioration in the adhesion properties of the latter.

It is an object of the present invention to provide such a method of surface modification of polymer materials, which would make it possible to use aqueous solutions having lower concentrations of mineral acids, and thus to preserve the initial strength of materials being treated.

Another object of the invention is to provide such a method of surface modification, which would allow the removal of acids from the surfaces of polymer materials in the process of their washing, which, in turn, would allow the obtaining of the required adhesion properties of the treated polymer materials.

Still another object of the invention is to cut down the time required for treating the surface of polymer materials.

In accordance with said and other objects, the present invention resides in that surface modification of polymer materials is effected by treating the latter with an aqueous solution comprising a mineral acid, a mineral oxidant and a salt of hydrochloric, hydrobromic or hydroiodic acid, said water, mineral acid, mineral oxidant and salt being taken in a weight ratio of 50–1000:0.3–7:0.1–7:1–15 respectively.

The method of the present invention, in contradistinction to that known heretofore, allows a drastic reduction in the initial concentration of the acid in the solution (from 98 down to 2.5%), and of the oxidant therein, whereby the modification process becomes essentially cheaper, and the initial strength of the material being treated remains unaffected. Moreover, the present method provides for cutting down the time required for the treatment (in some cases down to 5 sec.) with a view to obtaining the necessary adhesion properties of polymer materials.

In accordance with the present method, surfaces of various polymer materials may be modified, such as those based on synthetic rubbers, including isoprene rubber, styrenebutadiene rubber, natural rubber, and the like.

In the present method as mineral oxidants use may be made of, e.g., potassium dichromate, potassium bromate, potassium permanganate, sodium perchlorate, etc.

As halides use may be made of sodium bromide, potassium chloride, potassium iodide, zinc bromide, etc.

The present method of surface modification of polymer materials is effected in the following manner.

First, aqueous solutions of a mineral acid, a mineral oxidant and a halide are prepared. Then the thus prepared solutions are poured into a vessel, and a polymer material to be treated is placed thereinto. The polymer material is kept in the vessel over a period of 5 to 120 sec. The time of keeping the material in the vessel depends on the nature of the polymer material being treated and on the composition of the treating solution. After said period of keeping, the polymer material is washed with water and dried either at room temperature or with heating not over 90°C.

For cementing polymer materials to each other, or to a metal, wood, glass-reinforced plastic or glass, adhesive compositions are used which are based on rubbers, such as butadieneacrylonitrile, polyurethane rubbers, chlorinated chloroprene rubbers containing at least 700percent of chlorine, in combination with phenol-formaldehyde, epoxy, and other resins. The cementing of said materials is effected by using conventional (hot and cold) methods.

Presented in Table 1 hereinbelow are examples of treating solutions comprising halides, and the time is specified for treating different materials prior to cementing.

For evaluating the adhesion properties of the treated materials, presented in Tables 2 and 3 are the results of testing the cemented materials for resistance to separation. The following adhesive compositions were used for cementing (the amounts of the constituents being specified in parts by weight):

| | |
|---|---|
| Butadiene-acrylonitrile rubber, containing 25–50% of acrylonitrile groups | 100 |
| Magnesium oxide | 3–10 |
| Zinc oxide | 3–10 |
| Dibutyl sebacate | 5–10 |
| Phenol-formaldehyde resin based on p-tert.phenol | 15–50 |
| Silicon dioxide | 10–40 |
| Chlorinated chloroprene rubber, containing 64 mol.% of chlorine | 80–400 |
| Triaminotriphenyl-methane | 5–20 |

The cementing was carried out at room temperature. After having been kept during 1–3 days at room temperature, the cemented specimens were tested for separation on an adhesion tester.

Table 1

| No. of treating solution | Composition of treating solution, parts by weight | | Time of treatment, sec. | | | | |
|---|---|---|---|---|---|---|---|
| | | | vulcanizate | | | Polymer material | |
| | | | Based on isoprene rubber | Based on butadiene-styrene rubber | Based on natural rubber | Based on polystyrene | Based on polyamide |
| I | KBr | 1–10 | 5–30 | 10–40 | 10–40 | 10–90 | 15–120 |
| | $KMnO_4$ | 0.2–3.5 | | | | | |
| | $H_2SO_4$ | 0.5–5 | | | | | |
| | $H_2O$ | 50–500 | | | | | |
| II | NaCl | 1–10 | 5–30 | 10–30 | 15–40 | 10–120 | 10–120 |
| | $KBrO_3$ | 0.2–3.5 | | | | | |
| | $H_3PO_4$ | 0.3–7 | | | | | |
| | $H_2O$ | 50–800 | | | | | |
| III | NaI | 0.5–10 | 10–40 | 20–30 | 30–40 | — | — |
| | $KBrO_3$ | 0.1–3 | | | | | |
| | $H_2SO_4$ | 03.–5 | | | | | |
| | $H_2O$ | 50–700 | | | | | |
| VI | NaBr | 0.5–10 | 5–15 | 10–30 | 10–30 | — | — |
| | $KBrO_3$ | 0.1–3 | | | | | |
| | HCl | 0.7–7 | | | | | |
| | $K_2O$ | 50–500 | | | | | |
| V | KI | 0.5–10 | 30–40 | 10–40 | 30–40 | — | — |
| | $K_2Cr_2O_7$ | 0.1–7 | | | | | |
| | $H_2SO_4$ | 0.5–5 | | | | | |
| | $H_2O$ | 50–800 | | | | | |
| VI | KBr | 1–10 | 5–20 | 5–25 | 10–25 | — | — |
| | $KBrO_3$ | 0.1–3 | | | | | |
| | $HNO_3$ | 0.5–5 | | | | | |
| | $H_2O$ | 50–500 | | | | | |
| VII | $ZnBr_2$ | 1–10 | 10–50 | 5–60 | 15–60 | — | — |
| | $NaClO_4$ | 02.–6 | | | | | |
| | $H_2SO_4$ | 0.3–6 | | | | | |
| | $H_2O$ | 50–700 | | | | | |
| VIII | KBr | 1–10 | — | — | — | 10–90 | 10–100 |
| | $KBrO_3$ | 0.2–5 | | | | | |
| | $H_2SO_4$ | 0.5–7 | | | | | |
| | $H_2O$ | 50–1000 | | | | | |

Table 2

| No. of treating solution (same) as in Table 1 | Resistance to separation of vulcanizate from steel, kgf/cm | | |
|---|---|---|---|
| | Vulcanizate based on isoprene rubber | Vulcanizate based on butadiene-styrene rubber | Vulcanizate based on natural rubber |
| I | 10.7 for vulcanizate | 8.2 for vulcanizate | 10.2 for adhesive with tears of vulcanize |
| II | 8.2 for adhesive with tears of vulcanizate | 8.0 for vulcanizate | 8.9 for adhesive with tears of vulcanizate |
| III | 9.8 for vulcanizate | 9.0 for vulcanizate | 10.1 for adhesive with strong tears of vulcanizate |
| IV | 11.2 for vulcanizate | 9.7 for vulcanizate | 10.2 for vulcanizate |
| V | 10.8 for vulcanizate | 9.8 for vulcanizate | 9.9 for adhesive with tears of vulcanizate |
| VI | 11.4 for vulcanizate | 10.0 for vulcanizate | 11.3 for vulcanizate |
| VII | 8.7 for adhesive with tears of vulcanizate | 8.2 for vulcanizate | 8.4 for adhesive with tears of vulcanizate |

Table 3

| No. of treating solution employed for surface modification of polymer materials based on polystyrene and polyamide (same as in Table 1) | Resistance of vulcanizate based on natural rubber, treated with solution No.1, to separation from various polymer materials, kgf/cm | |
|---|---|---|
| | Polymer material, based on polystyrene | Polymer material, based on polyamide |
| I | 8.9 for adhesive with tears of vulcanizate | 9.1 for adhesive with tears of vulcanizate |
| II | 7.8 for adhesive with tears of vulcanizate | 10.0 for adhesive with tears of vulcanizate |
| VIII | 10.2 for adhesive | 11.2 for adhesive |

What is claimed is:

1. A method of surface modification of a polymer selected from the group consisting of isoprene rubber, styrenebutadiene rubber, and natural rubber, to thereby improve substantially the surface adhesion properties thereof, comprising treating said polymer with an aqueous solution comprising a mineral acid, a mineral oxidant selected from the group consisting of potassium bromate, potassium permanganate, and sodium perchlorate and a member of the group consisting of sodium, potassium, and zinc salts of hydrochloric, hydroiodic and hydrobromic acids, the water, said mineral acid, said mineral oxidant and said salt in said aqueous solution being taken in a weight ratio of 50–1000:0.3–7:0.1–7:1–15, respectively.

2. A method as defined in claim 1, wherein said polymer is isoprene rubber.

3. A method as defined in claim 1, wherein said polymer is styrene-butadiene rubber.

4. A method as defined in claim 1, wherein said polymer is natural rubber.

* * * * *